J. J. SHUPE.
DOUGH ROUNDING MACHINE.
APPLICATION FILED OCT. 9, 1911.

1,037,343.

Patented Sept. 3, 1912.

Witnesses
F. E. Ernst
Chas. W. Stauffiger

Inventor
Joseph J. Shupe,
By Bartlett ...
Attorneys

UNITED STATES PATENT OFFICE.

JOSEPH J. SHUPE, OF DETROIT, MICHIGAN, ASSIGNOR OF ONE-HALF TO CHARLES E. PUTMAN, OF DETROIT, MICHIGAN.

DOUGH-ROUNDING MACHINE.

1,037,343.   Specification of Letters Patent.   Patented Sept. 3, 1912.

Application filed October 9, 1911. Serial No. 653,481.

*To all whom it may concern:*

Be it known that I, JOSEPH J. SHUPE, a citizen of the United States of America, residing at Detroit, in the county of Wayne and State of Michigan, have invented certain new and useful Improvements in Dough-Rounding Machines, of which the following is a specification, reference being had therein to the accompanying drawings.

This invention relates to dough-rounding machines especially adapted to be used in bakeries where a large quantity of breadloaves is made from lumps of dough cut from the mass and subsequently "rounded" to form the individual loaves, and it has for one of its objects the provision of a machine into which the severed lumps are successively fed either by a conveyer or by hand, and which forms the lumps into smooth balls rapidly and effectively.

A further object of the invention resides in the provision of a rolling trough through which the several lumps travel and are turned over to "seal" their raw surface-portions.

Further objects of the invention will hereinafter appear and be particularly defined in the claims.

The invention has been clearly illustrated in the accompanying drawings, in which similar characters denote similar parts, and in which—

Figure 1:
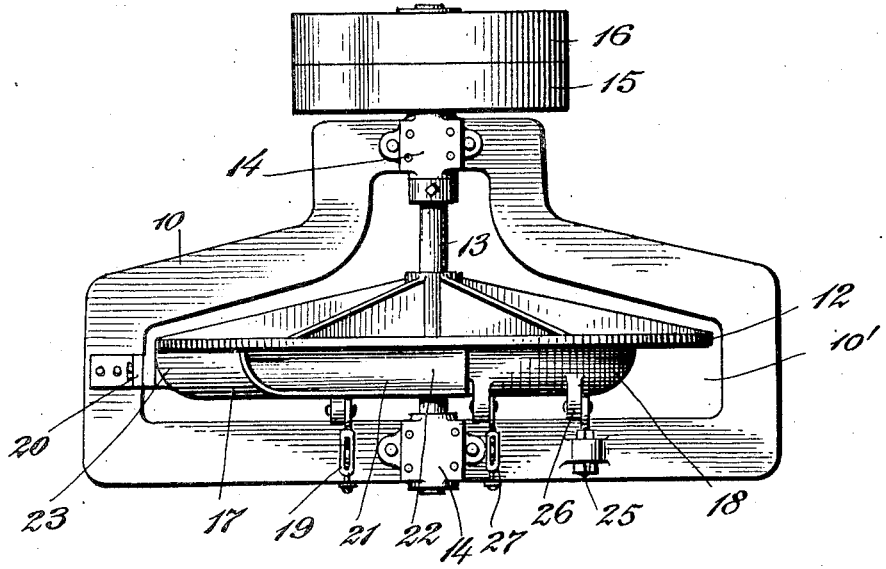
Figure 2:
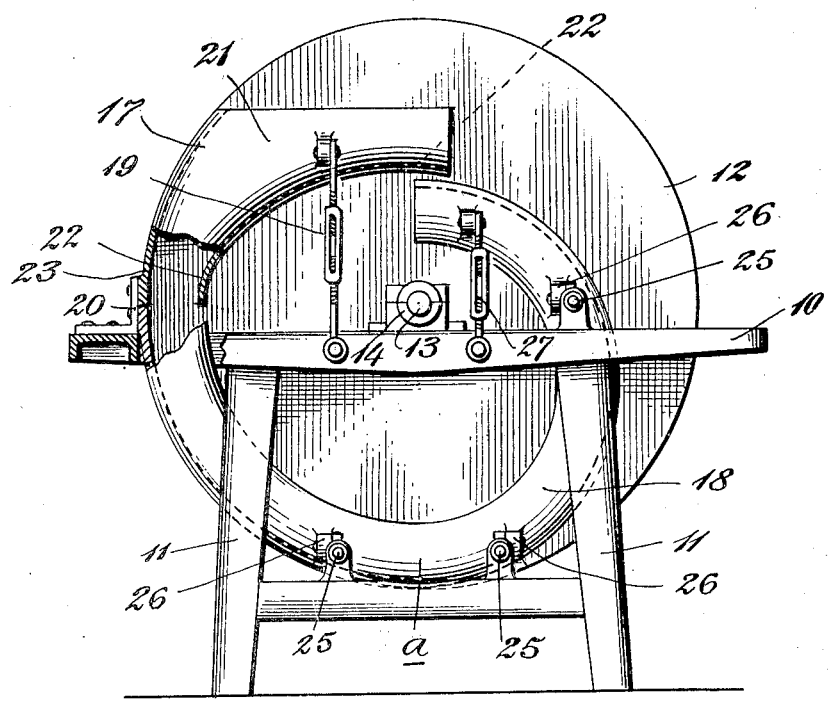

Figure 1 is a top view of a machine embodying my invention; and Fig. 2 is a front view thereof.

Referring to the drawings, 10 denotes a base plate, supported by legs 11 and cut out, as at 10′, to afford room for a disk 12 which is secured to a shaft 13. The latter is journaled in bearings 14 secured to the plate 10, and has tight and loose pulleys 15, 16 to which power may be applied from any convenient source. Adjacent the front face of the disk, is a trough comprising a receiving-section 17 and a rolling-section 18, the former of which is held stationary but adjustable relatively to the face of the disk by a turnbuckle-rod 19, and also by a bracket 20 secured to the plate 10. This "receiving" section consists substantially of a curved tube of semi-circular cross section having its edges adjacent the disk but clear therefrom. The top of the receiving-tube is cut away at 21 to form an inlet opening into which the dough-pieces or lumps are dropped and rest upon the bottom-ledge 22 (see dotted lines and section in Fig. 2). It will be noted that this inlet portion is nearer to the center of the disk than the outer or delivery end 23 thereof, the particular object being to deposit the dough against a comparatively slow-moving portion of the diskface, the dough clinging thereto and being propelled thereby toward the periphery where it will enter the rolling-section 18 which for its first quarter follows the periphery of the disk and therefore allows the dough to acquire a high momentum and speed until it arrives at the bottom (see *a*) and is then propelled under this high velocity through the remainder of the rolling section which terminates near the center of the disk, and in fact, just below the inlet portion of the receiving section. Hence it will be seen that the dough will travel through a double spirally-formed trough and be rolled-over by the frictional drag of the disk and the resisting hold-back action of the trough-wall. Similarly to the receiving-section 17, the rolling-section is also adjustably supported by adjustable bolts 25 engaging ears 26 on said section, and also by a turnbuckle-rod 27 held on the base plate 10.

In operation, the disk-surface should be smooth and entirely free from loose flour, as otherwise the dough will not be "wet" enough to stick to the disk surface sufficiently to be propelled or rolled-over thereby. From this it follows that my present machine is practically opposite in its operation from the machines heretofore used, and that furthermore a great saving of flour is effected.

In view of the velocity of the disk and the comparatively short travel of the dough, it is evident that the latter is "rounded" very quickly, and the machine has a large capacity, as experience has fully demonstrated, a feature which is furthermore enhanced in value, since the less dry the dough is, the better the machine will do its work.

It is obvious that the formation or construction of some of the elements of the machine herein shown and described may be varied without departing from the spirit of the invention.

I claim:—

1. In a machine of the character described, the combination with a vertically disposed rotatable disk and means for rotating said disk, of a dough rolling trough having an open side closed by the said disk and arranged spirally around the axis of said disk with its inlet end midway between the periphery and the center of the disk, its intermediate portion adjacent to the periphery of the disk and its discharge end between the inlet end and the center of the disk, and means for supporting and holding the trough against the face of the disk.

2. In a machine of the character described, the combination of a vertically disposed rotatable disk, means for rotating said disk, a dough rolling trough having an open side closed by said disk and comprising a receiving portion arranged with its receiving end adjacent to the center of the disk, and a rolling portion forming a continuation of the receiving portion and extending adjacent to the periphery of the disk and spirally around the axis thereof with its discharge end adjacent to said axis, and bolts adjustably supporting the trough and adapted to move the same into contact with the face of said disk.

In testimony whereof I affix my signature in presence of two witnesses.

JOSEPH J. SHUPE.

Witnesses:
F. E. ERNST,
LEWIS E. FLANDERS.